US008249608B2

(12) United States Patent
Heo et al.

(10) Patent No.: US 8,249,608 B2
(45) Date of Patent: Aug. 21, 2012

(54) APPARATUS AND METHOD FOR ALLOCATING RESOURCES IN A MOBILE COMMUNICATION SYSTEM

(75) Inventors: Youn-Hyoung Heo, Suwon-si (KR); Ju-Ho Lee, Suwon-si (KR); Yong-Jun Kwak, Yongin-si (KR); Soeng-Hun Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1092 days.

(21) Appl. No.: 12/114,222

(22) Filed: May 2, 2008

(65) Prior Publication Data

US 2008/0274749 A1    Nov. 6, 2008

(30) Foreign Application Priority Data

May 2, 2007 (KR) .................. 10-2007-0042824
Aug. 2, 2007 (KR) .................. 10-2007-0077612

(51) Int. Cl.
*H04W 72/00* (2009.01)

(52) U.S. Cl. ............... 455/450; 455/452.1; 370/329; 370/343; 370/348

(58) Field of Classification Search .............. 455/450, 455/452.1; 370/329, 343, 348
See application file for complete search history.

(56) References Cited

U.S. PATENT DOCUMENTS

| 6,453,351 | B1 * | 9/2002 | Endo .......................... 709/229 |
| 2004/0153767 | A1 * | 8/2004 | Dolgonos .................... 714/18 |
| 2005/0249114 | A1 | 11/2005 | Mangin et al. |
| 2007/0086367 | A1 | 4/2007 | Sung et al. |
| 2008/0045272 | A1 * | 2/2008 | Wang et al. ............... 455/561 |
| 2008/0232284 | A1 * | 9/2008 | Dalsgaard et al. ......... 370/310 |

FOREIGN PATENT DOCUMENTS

| KR | 1020070021726 | 2/2007 |
| WO | WO 2006/115391 | 11/2006 |

* cited by examiner

*Primary Examiner* — Amancio Gonzalez
(74) *Attorney, Agent, or Firm* — The Farrell Law Firm, P.C.

(57) ABSTRACT

A resource allocation method and apparatus for downlink transmission of a base station in a mobile communication system. The base station compares the number Ntx of data transmissions with the number Nper of available persistent resource allocations, and allocates resources by at least one of a persistent resource allocation scheme and a dynamic resource allocation scheme according to the comparison result.

16 Claims, 9 Drawing Sheets

APPARATUS AND METHOD FOR ALLOCATING RESOURCES IN A MOBILE COMMUNICATION SYSTEM

PRIORITY

This application claims priority under 35 U.S.C. §119(a) to a Korean Patent Application filed in the Korean Intellectual Property Office on May 2, 2007 and assigned Serial No. 2007-42824, and a Korean Patent Application filed in the Korean Intellectual Property Office on Aug. 2, 2007 and assigned Serial No. 2007-77612, the disclosure of which is incorporated herein by reference.

BACKGROUND OF THE INVENTION

1. Field of the Invention

The present invention relates generally to an apparatus and method for allocating resources in a mobile communication system, and in particular, to a resource allocation apparatus and method for efficiently transmitting Voice over Internet Protocol (VoIP) packets in a mobile communication system.

2. Description of the Related Art

Wireless communication systems have been developed to cope with the situation where it is not possible to connect a fixed wire network up to terminals. The typical wireless communication systems include not only the normal mobile communication system for providing voice and data services, but also a Wireless Local Area Network (WLAN), a Wireless Broadband Internet (Wibro), a Mobile Ad-Hoc network, etc.

Mobile communication, unlike the normal wireless communication, is premised on mobility of users. The ultimate aim of mobile communication is to enable users to exchange information and media at anytime and anyplace using Mobile Stations (MSs) such as a portable phone, a Personal Data Assistant (PDA), and a radio pager. With the rapid development of communication technology, the mobile communication system has reached a phase of providing not only the normal voice call services but also high-speed data services in which the transmission of high-volume digital data such as moving images as well as e-mail and still images is possible using the mobile terminals.

In addition, due to various user demands for high-quality services, there is an increasing need for a communication system capable of efficiently providing high-speed packet data services. In order to meet the need, many companies are looking for a new method capable of reducing the cost related to providing voice services without depriving the convenience of and familiarity with the existing services from the users. The cost reduction accelerates integration of the data network and the voice network, and a careful system design and planning is needed to prevent the integration of the data network and the voice network from affecting the quality and reliability of the voice network.

In this context, Voice over IP (VoIP) is now under discussion, which transmits voice packets over a packet network.

Traffic characteristics of the VoIP service will now be described with reference to FIG. 1.

FIG. 1 is a diagram illustrating traffic characteristics of a VoIP service in a normal mobile communication system, in which an Adaptive Multirate Codec (AMR) vocoder generates traffic. The generation period and traffic size of voice data, though they are subject to change according to the vocoder type, have the following characteristics.

A period where traffic exists is called a talkspurt period 101, while the other period is called a silent period 103. The vocoder generates packet data with a predetermined size every 20 ms 102 in the talkspurt period 101, and generates a Silent Indicator (SID) having a fixed size every 160 ms 104 in the silent period 103. While a size of the voice data is about 40 bytes even at the full rate, a size of the normal Internet data is several hundreds to several thousands of bytes. Therefore, it can be considered that the size of the voice data is significantly greater than the size of the normal Internet data.

Transmitting a Physical Downlink Control Channel (PDCCH) for transmitting scheduling information or resource allocation information at every transmission time in order to transmit small-sized voice data generated every 20 ms 102 can be significant signaling overhead. Therefore, a persistent resource allocation method or a persistent scheduling method has been proposed to efficiently support the services having the foregoing characteristics. With reference to FIG. 2, a description will now be made of the persistent resource allocation method or the persistent scheduling method.

FIG. 2 is a diagram illustrating a persistent scheduling method in a normal mobile communication system.

A terminal is allocated particular time and particular resource in the entire 20-ms period through upper layer signaling or PDCCH. In the case of FIG. 2, the terminal is allocated persistent resources in three Transmission Time Intervals (TTIs). The persistent resources can be identified through upper layer signaling or PDCCH during call setup. In the latter case, the PDCCH needs to have bit information indicating whether the corresponding resource allocation is the dynamic resource allocation or the persistent resource allocation. It can be noted in FIG. 2 that 3 TTIs 201, 202 and 203 are allocated at intervals of 5 ms for the 20-ms period using the persistent resource allocation method, and it can be appreciated that a total of 4 transmission opportunities can be given considering a Hybrid Automatic Repeat reQuest (HARQ) Round Trip Time (RTT). However, in the case of FIG. 2, the third one of the transmission opportunities is persistently allocated. Then the terminal attempts demodulation of a Physical Downlink Shared Channel (PDSCH), over which data is transmitted, at particular times 201, 202 and 203 where the resources are allocated, using information on the previously persistently allocated resources even when there is no PDCCH information transmitted to the terminal.

However, the foregoing normal persistent resource allocation method or persistent scheduling method should always persistently allocate resources as many times as the required number of transmissions, causing a reduction in the scheduling flexibility and the total resource efficiency. In order to solve this problem, a new method is now under discussion, in which a transmission side allocates resources using the persistent resource allocation method only for initial transmission, and when retransmission occurs, as it has failed to receive a Not-Acknowledge (NACK) message indicating a failure to receive data from a reception side, the transmission side performs dynamic resource allocation using PDCCH.

With reference to FIG. 3, a description will now be made of the initial transmission-limited persistent resource allocation method.

FIG. 3 is a diagram illustrating a method of using persistent scheduling only for initial transmission in a normal mobile communication system. In FIG. 3, a base station allocates resources with the persistent resource allocation method only in one TTI in the 20-ms period as shown by reference numerals 303 and 306.

A terminal can perceive that the base station allocates resources with the persistent resource allocation method always at the initial time 303 in the 20-ms period, and when the base station fails in its transmission of resource allocation information caused by the persistent resource allocation method at the initial time, the base station transmits resource allocation information or scheduling information using PDCCH 301 as shown by reference numerals 309, 310, 311 and 312. When the terminal perceives that there is resource allocation information transmitted thereto through PDCCH 301 at the transmission times 309, 310, 311 and 312, the terminal receives data 304, 305, 307 and 308 through resources indicated by the resource allocation information transmitted at the transmission times 309, 310, 311 and 312.

In FIG. 3, the base station allocates resources with the persistent scheduling method at the predetermined transmission times 303 and 306, and performs resource allocation dynamically at the transmission times 309, 310, 311 and 312, and the terminal receives data through the resources 304, 305, 307 and 308 indicated by resource allocation information for the dynamically allocated resources. However, since the method, shown in FIG. 3, which allocates resources with the persistent resource allocation method only for the initial transmission and allocates resources dynamically for the next transmissions, increases the required number of PDCCHs as the number of retransmissions at the transmission side increases, the method may also increase the signaling overhead as in the dynamic resource allocation scheme. At a low initial transmission Block Error Rate (BLER), the number of terminals performing retransmission is small. However, the normal system has difficulty in maintaining the low initial transmission BLER for the following four reasons.

1. Inaccuracy of Selecting Modulation and Coding Scheme (MCS) Level

When performing persistent resource allocation for initial transmission, the base station fixes not only the position and amount of wireless resources but also the MCS level. In the downlink, the terminal makes a decision (selection) based on received Channel Quality Indicator (CQI) information, and in the uplink, the base station makes a decision based on the pilot transmitted by the terminal. In this case, a measurement error on CQI and pilot strength may occur. When a moving velocity of the terminal is high, the measurement error will increase considerably. Since this value is not correct, it is difficult to select an MCS level so that the base station can maintain a low BLER.

2. Instability of Power Control

There is a need to maintain a constant reception power level through power control in order to maintain the scheduled MCS. To this end, it is necessary to measure CQI or pilot. However, a measurement error on the CQI or pilot occurs due to the measurement error or the velocity of the terminal, making it difficult to perform perfect power control.

3. Inter-Cell Interference

Even though an MCS level was correctly selected, if inter-cell interference measured during the decision is different from inter-cell interference during actual transmission, it is not possible to satisfy the desired BLER. Since an Orthogonal Frequency Division Multiple Access (OFDMA) system is significantly susceptible to interference compared to the Code Division Multiple Access (CDMA) system, the OFDMA system has more difficulty in maintaining a low initial BLER.

4. Power Shortage of Terminals Located in Cell Boundary

In the uplink, a terminal located in the cell boundary may not support a high data rate or a high initial transmission BLER due to a power shortage. In this case, the terminal can transmit data with low transmission power if the terminal increases an initial data rate and transmits the data after dividing it into several segments.

SUMMARY OF THE INVENTION

An aspect of the present invention is to address at least the problems and/or disadvantages recited above and to provide at least the advantages described below. Accordingly, an aspect of the present invention is to provide an apparatus and method for allocating resources to transmit Voice over Internet Protocol (VoIP) data on the uplink or downlink in a mobile communication system.

According to one aspect of the present invention, there is provided a resource allocation method for uplink transmission of a terminal in a mobile communication system. The method includes receiving resources allocated from a base station for the uplink transmission. Preferably, the resources allocated from the base station are resources allocated by at least one of a persistent resource allocation scheme and a dynamic resource allocation scheme according to a comparison result between a number of data transmissions at the terminal and a number of available persistent resource allocations.

According to another aspect of the present invention, there is provided a resource allocation method for downlink transmission of a base station in a mobile communication system. The method includes comparing a number of data transmissions with a number of available persistent resource allocations; and allocating resources by at least one of a persistent resource allocation scheme and a dynamic resource allocation scheme according to the comparison result.

According to another aspect of the present invention, there is provided a resource allocation apparatus in a terminal apparatus for a mobile communication system. The apparatus includes a reception unit for receiving information on resources allocated from a base station. Preferably, uplink resources allocated from the base station are resources allocated by at least one of a persistent resource allocation scheme and a dynamic resource allocation scheme according to a comparison result between a number of data transmissions at the terminal apparatus and a number of available persistent resource allocations.

According to another aspect of the present invention, there is provided a resource allocation apparatus in a base station apparatus for a mobile communication system. The apparatus includes a resource allocation controller for comparing a number of data transmissions with a number of available persistent resource allocations, and allocating resources by at least one of a persistent resource allocation scheme and a dynamic resource allocation scheme according to the comparison result; and a transmitter for transmitting information on allocated resources.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness.

In order to address the problems stated in the conventional technology, the present invention provides a scheme for not only performing persistent scheduling for initial transmission, but also performing persistent scheduling when the transmission reaches a predetermined number of retransmissions.

In other words, an embodiment of the present invention provides a method for variably setting the case where persistent resource allocation is available. It is possible to set the number of available persistent resource allocations in a given duration ('Nper') separately for each terminal, or can set Nper separately for each cell taking into account the desired average number of transmissions. In the former case, it is possible to set Nper taking into account the channel condition, moving velocity and available transmission power of each terminal.

Although a detailed description of the present invention will be given herein with reference to transmission of downlink VoIP service, by way of example, the basic concept of the present invention can be applied even to the uplink in the same way. In addition, while a description of the present invention will be made herein as to a resource allocation method for transmitting VoIP data, it is not intended to limit the present invention thereto, and the same can also be applied to a resource allocation method for transmitting/receiving normal data. When the present invention is applied to the uplink, a base station allocates resources to a terminal, and the terminal transmits data through the allocated resources on the uplink.

Figure 1:
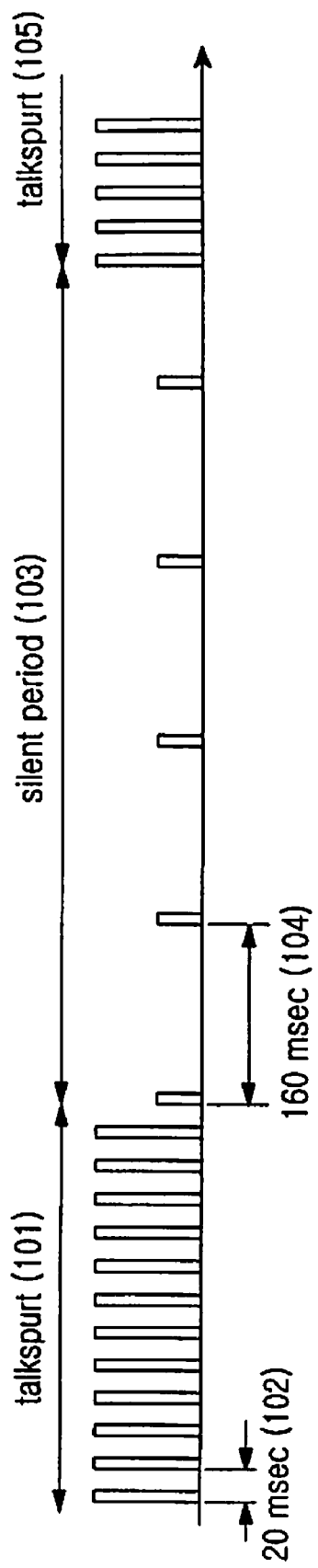
FIG. 1 is a diagram illustrating traffic characteristics of a VoIP service in a normal mobile communication system.
Figure 2:
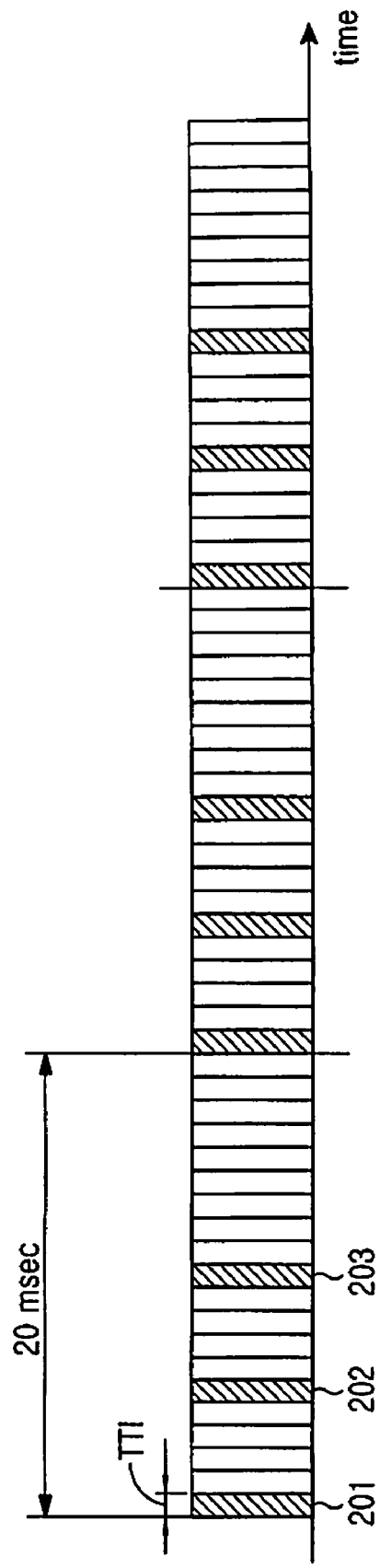
FIG. 2 is a diagram illustrating a persistent scheduling method in a normal mobile communication system.
Figure 3:
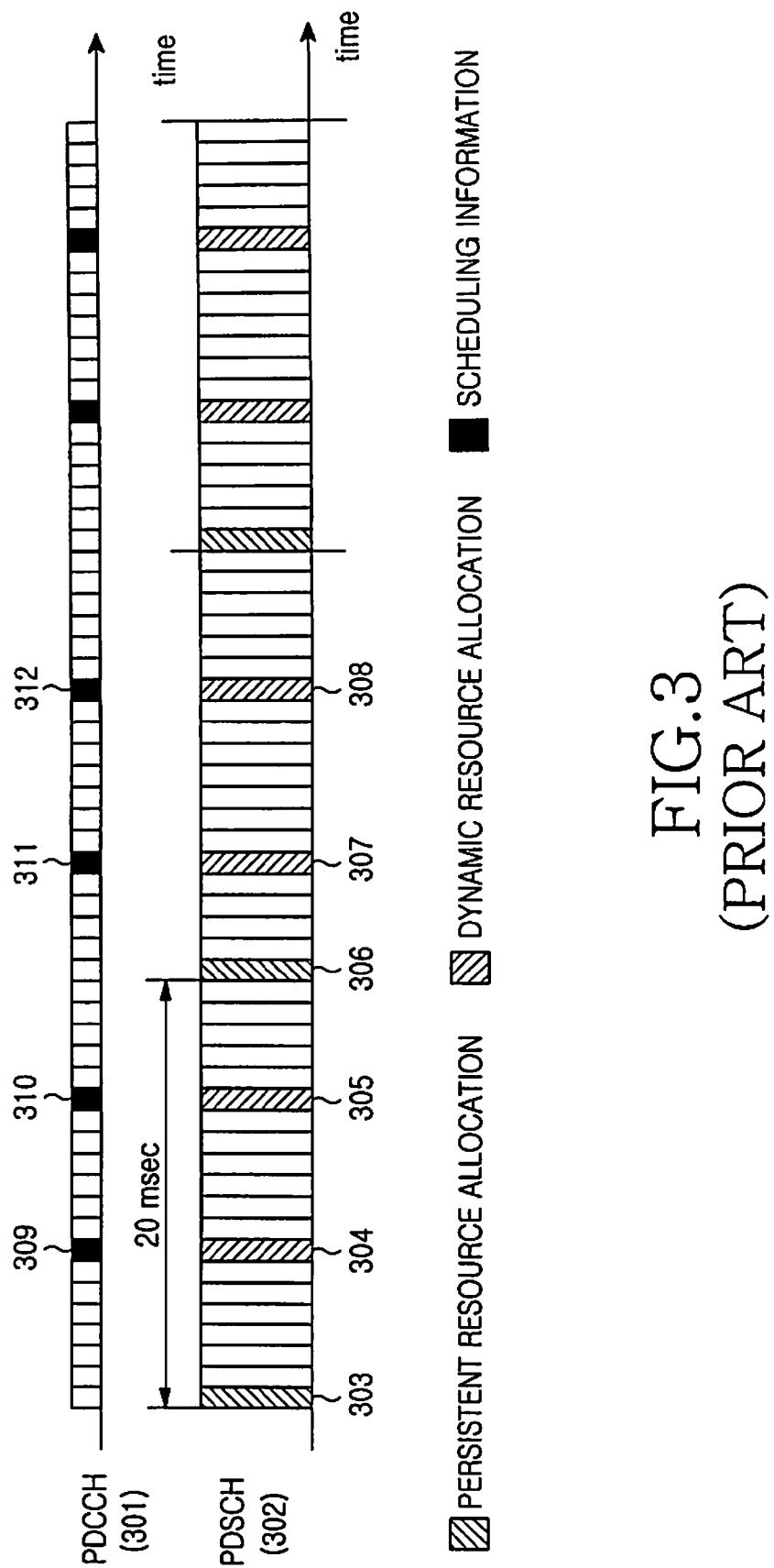
FIG. 3 is a diagram illustrating a method of using persistent scheduling only for initial transmission in a normal mobile communication system.
Figure 4:
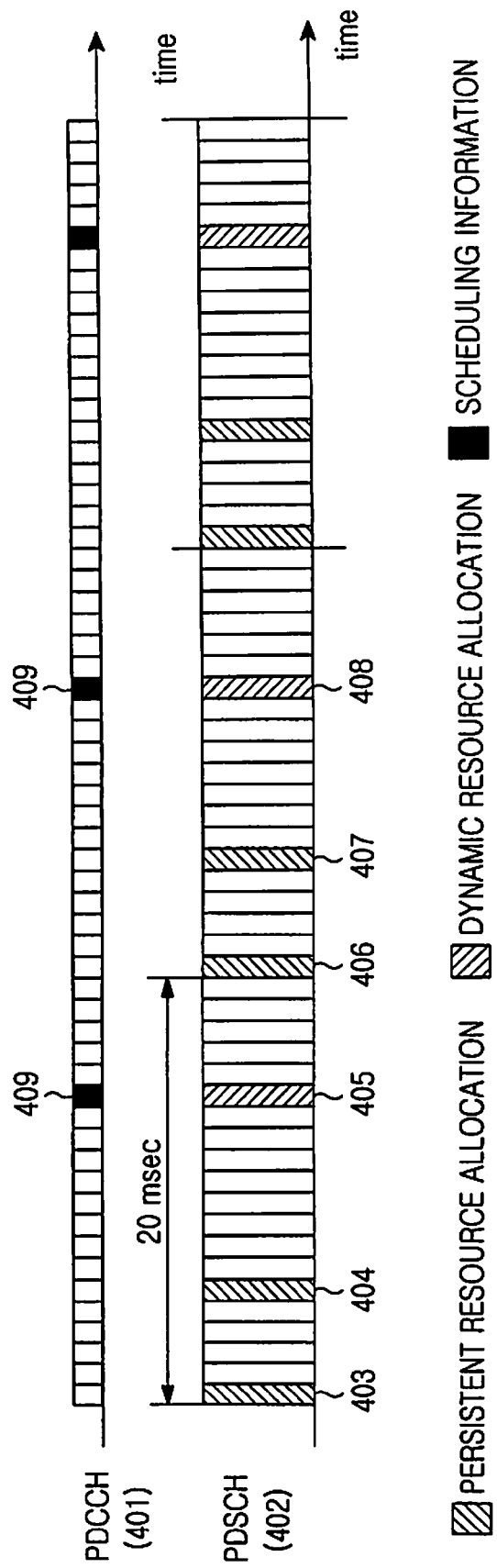
FIG. 4 is a diagram illustrating a method for asynchronously transmitting retransmission data while transmitting/receiving VoIP data in a mobile communication system according to an embodiment of the present invention.

A process of performing dynamic resource allocation and persistent resource allocation according to an embodiment of the present invention will be described with reference to FIGS. 4, 5A and 5B. FIGS. 4 to 5B show a scheme for allocating dynamic resources according to an embodiment of the present invention.

FIG. 4 is a diagram illustrating a method for asynchronously transmitting retransmission data while transmitting/receiving VoIP data in a mobile communication system according to an embodiment of the present invention.

That is, shown in FIG. 4 is the case where the initial transmission and the first retransmission undergo resource allocation by means of a persistent resource allocation scheme according to an embodiment of the present invention.

When the entire system is a synchronous Hybrid Automatic Repeat reQuest (HARQ) system, a retransmission time will be determined naturally at intervals of a predetermined time, and when the entire system is an asynchronous HARQ system, the asynchronous system can variably set the retransmission time rather than performing resource allocation and determining retransmission time at intervals of the predetermined time at the synchronous system, but the asynchronous system defines the retransmission time taking into account HARQ Round trip time (RTT) after the initial transmission.

In other words, in the synchronous HARQ system where the total number of HARQ processes is 5, if a base station performs initial transmission at a time 403, the base station performs retransmission at a time 404 which is a $6^{th}$ TTI. Therefore, when the base station persistently allocates resources for data transmission twice, resources persistently are allocated at transmission times 403 and 404.

On the contrary, in the asynchronous HARQ system, although the base station can allocate resources at the times 403 and 404, the base station can allocate retransmission times (or resources) even at a $7^{th}$ TTI or an $8^{th}$ TTI other than the $6^{th}$ TTI 404.

Referring to FIG. 4, a terminal receives initial transmission data through PDSCH 402 at the persistently allocated first transmission time 403, and when the terminal fails in demodulation at the first transmission time 403, a base station, since it should transmit retransmission data, retransmits the data using persistent resource allocation information at the time 404 without the resource allocation information on PDCCH 401. If even the first retransmission 404 also fails, the base station should perform the second retransmission, and for that purpose, the base station transmits resource allocation information using PDCCH 401 as shown by reference numeral 409. The terminal receives resource allocation information through PDCCH 401 as shown by reference numeral 409, and can determine if the second retransmission 405 is performed. That is, the terminal should always monitor PDCCH 401 since the terminal has no information as to when scheduling information will be transmitted through PDCCH. Since the initial transmission 403 and the first retransmission 404 are persistently allocated, their associated transmission times are fixed. However, since asynchronous HARQ can be performed from the second retransmission 405, it is possible to transmit retransmission data at any TTI after RTT.

When the transmission does not succeed within Nper, the base station transmits retransmission data through dynamic resource allocation at the next retransmission time. To this end, the base station transmits dynamic resource allocation information or dynamic scheduling information through PDCCH 401 as shown by reference numeral 409, and performs retransmission as shown by reference numeral 405. The term 'retransmission data' as used herein can be the same coded data as the initial transmission data in the HARQ technique based on Chase Combining, and in the HARQ technique realized with Incremental Redundancy (IR), even though information data is equal, other coded data can be transmitted.

Reference numerals 403 and 404 represent the data that can undergo demodulation and decoding using the previously transmitted persistent resource allocation information or persistent scheduling information, and reference numeral 405 represents an operation of demodulating and decoding the data transmitted through PDSCH using dynamic resource allocation information or dynamic scheduling information transmitted through PDCCH 401 instead of persistent resource allocation information.

That is, since shown in FIG. 4 is the asynchronous HARQ transmission scheme, when there is a need for data retransmission using dynamic resources, the resources can be allocated so that a time interval between the time the dynamic resources will be allocated and a retransmission time before the time the dynamic resources will be allocated is different from a time interval between the initial transmission and the first retransmission of the data.

Figure 5A:
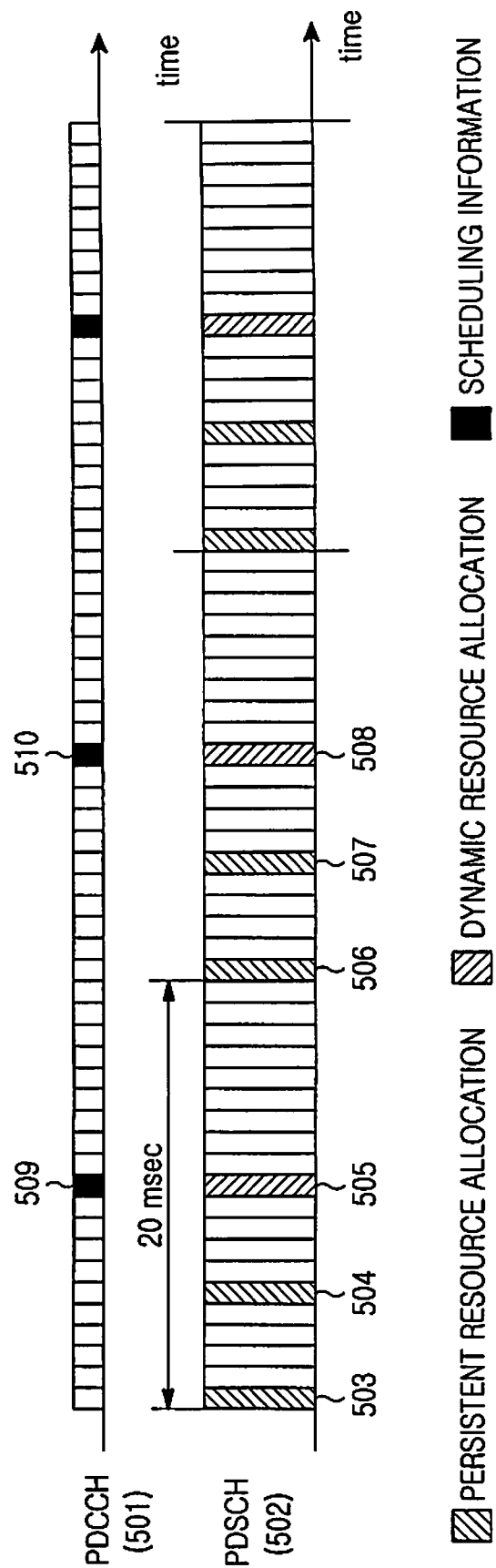
FIG. 5A is a diagram illustrating a method for synchronously transmitting retransmission data while transmitting/receiving VoIP data according to an embodiment of the present invention.
Figure 5B:
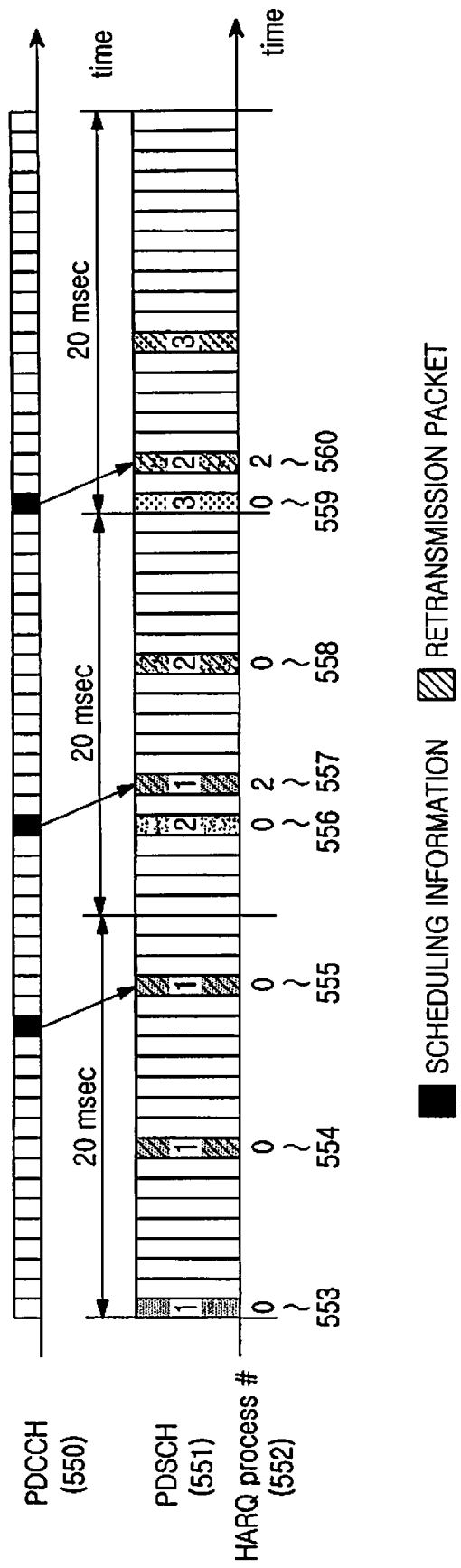
FIG. 5B is a diagram illustrating a method for synchronously retransmitting retransmission data in the same HARQ process as that of the initial transmission in a particular period and transmitting the data in another HARQ process in the next period while transmitting/receiving VoIP data according to an embodiment of the present invention.

FIG. 5A is a diagram illustrating a method for synchronously transmitting retransmission data while transmitting/receiving VoIP data according to an embodiment of the present invention. Resources are allocated with the persistent resource allocation scheme for the initial transmission 503 and the first retransmission 504, and resources allocated with the dynamic resource allocation scheme for the second retransmission 505. However, the time for the second retransmission 505 is located in the same position as the time interval between the initial transmission 503 and the first retransmission 504.

Therefore, in the synchronous HARQ system where the entire system operates with synchronous HARQ, since the retransmission time after persistent resource allocation is fixed, even the third transmissions 505 and 508 are performed at synchronous HARQ retransmission times.

Although the synchronous HARQ system should always transmit data during retransmission, a receiver, according to the present invention, should wait without receiving retransmission data when it cannot receive resource allocation information through PDCCH during retransmission, if the number Ntx of transmissions for VoIP data transmitted with the persistent resource allocation scheme exceeds Nper.

When there is a need for data retransmission in FIG. 5A, the resources are allocated so that a time interval between the time the dynamic resources will be allocated and a retransmission time before the time the dynamic resources will be allocated is equal to the time interval between the initial transmission and the first retransmission of the data.

FIG. 5B is a diagram illustrating a method for synchronously retransmitting retransmission data in the same HARQ process as that of the initial transmission in a particular period and transmitting the data in another HARQ process in the next period while transmitting/receiving VoIP data according to an embodiment of the present invention.

Shown in FIG. 5B is a method in which when retransmission is required after 20 ms in a system where initial transmission is fixed in every 20 ms, which is a generation unit of each VoIP data, the retransmission may collide with initial transmission of the next VoIP data, so a transmission side, in order to avoid the collision, transmits the retransmission data that should be transmitted after 20 ms, through an HARQ process different from the HARQ process used for the initial transmission.

In FIG. 5B, the total number of HARQ processes 552 is assumed to be 8.

That is, it is shown in FIG. 5B that in the initial 20-ms period 570, VoIP data #1 undergoes initial transmission, first retransmission and second retransmission through an HARQ process #0 as shown by reference numerals 553, 554 and 555, and in the next 20-ms period 580 after a lapse of the 20-ms period 570, the VoIP data #1 undergoes third retransmission 557 through an HARQ process #2 since VoIP data #2 should be transmitted through the HARQ process #0.

In other words, it is shown in FIG. 5B that in a predetermined period starting from a generation time of data, the data is retransmitted using a first HARQ process used for its initial transmission, and after the predetermined period, the data is retransmitted using a second HARQ process different from the first HARQ process.

As in FIG. 4 or 5A, the initial transmission and first retransmission undergo resource allocation with the persistent resource allocation scheme as shown by reference numerals 553 and 554, and the second retransmission is allocated dynamic resources, and since the HARQ process #0 can be used in the 20-ms period, the second retransmission is performed through the HARQ process #0 as shown by reference numeral 555. When there is a need for further retransmission, since the system is a synchronous HARQ system, the retransmission should be performed through the HARQ process #0 shown by reference numeral 556. However, since the time for initial transmission of VoIP data #2 to be transmitted after the VoIP data #1 is fixed, the next VoIP data #2 should be transmitted.

The third transmission of the previous VoIP data #1 is performed through the HARQ process #2 as shown by reference numeral 557. Since the third transmission 555 of the VoIP data #1 is performed exceeding Nper, the third transmission 555 undergoes scheduling through PDCCH 550. When VoIP data to be retransmitted occurs at a time after the 20 ms, a position of a new HARQ process where the retransmission VoIP data will be transmitted can be previously identified by the transmission side to the reception side by upper layer signaling, or the reception side can detect the position through PDCCH 550.

It can be noted in FIG. 5B that after VoIP data #2 undergoes initial transmission through the HARQ process #0 as shown by reference numeral 556, the first retransmission of the VoIP data #2 can also be performed through the HARQ process #0 as shown by reference numeral 558. Thereafter, when new VoIP data #3 should be transmitted as the 20-ms period 580 expires, initial transmission of the VoIP data #3 happens through HARQ process #0 as shown by reference numeral 559. However, when there is a need for the second retransmission (or third transmission) of the VoIP data #2, it is performed through the HARQ process #2 as shown by reference numeral 560, and since it has exceeded Nper, it is allocated dynamic resources.

Table 1 shows setting information necessary for variably setting persistent resource allocation not only for the initial transmission but also for a part of retransmission according to an embodiment of the present invention.

TABLE 1

| Information | Description |
| --- | --- |
| Resource information | Position and amount of frequency resources |
| MCS information | Modulation and coding rate information |
| Number of available persistent resource allocations (Nper) | The number of transmissions where persistent resource allocation is available |

The following methods are available as a method for signaling the setting information of Table 1.
- Method 1: This method provides the entire setting information by upper layer signaling.
- Method 2: This method provides resource/MCS information through PDCCH, and provides Nper by upper layer signaling.
- Method 3: This method provides resource/MCS information through PDCCH, and calculates Nper depending on the number of possible transmissions through the same HARQ process for 20 ms. In order to apply this method, the resource/MCS information allocated through one PDCCH should be defined such that it is available only at a certain transmission time in the 20 ms.

Figure 6:
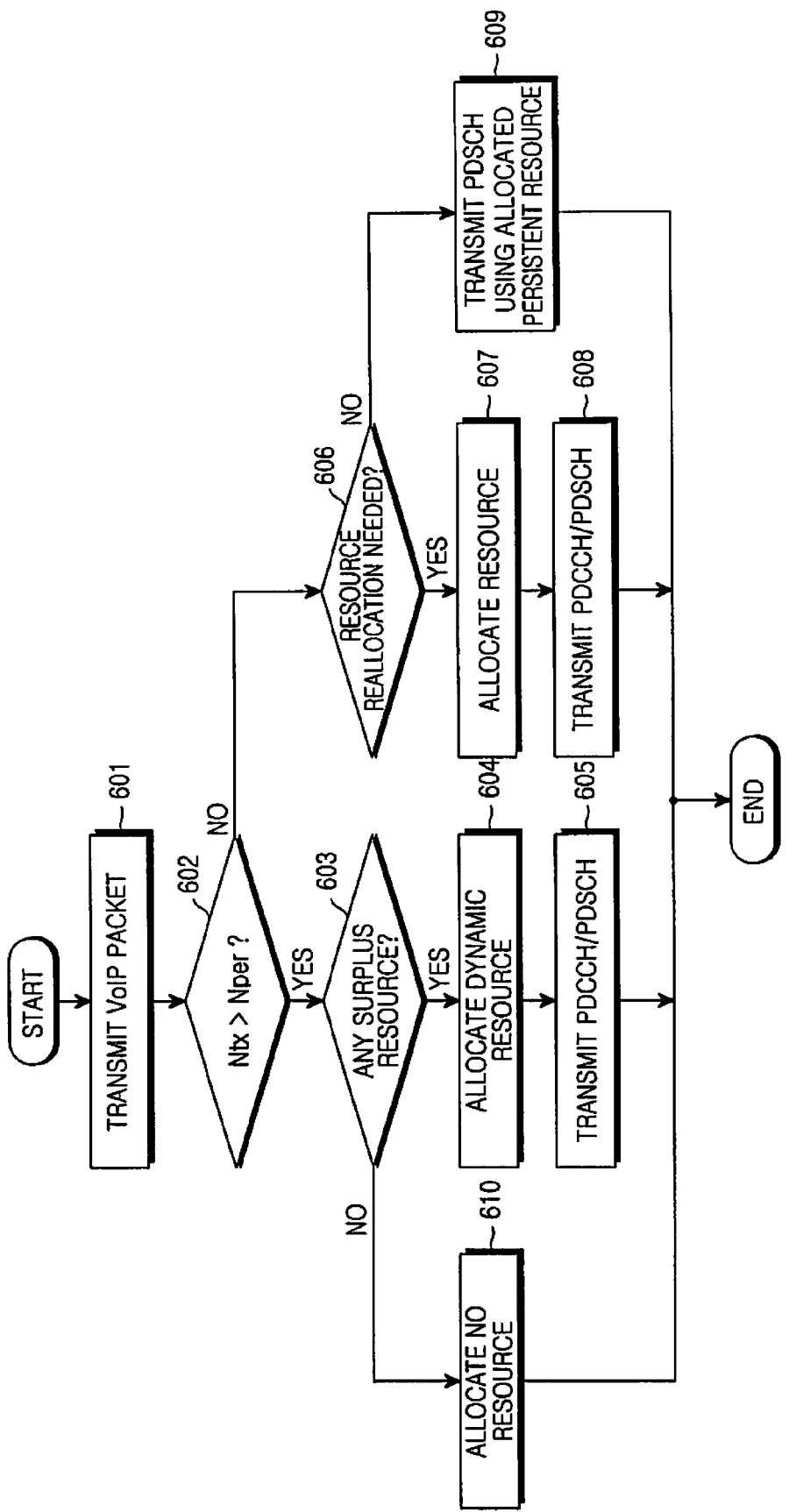
FIG. 6 is a flowchart illustrating a method for performing resource allocation for transmission of VoIP data in a base station according to an embodiment of the present invention.

FIG. 6 is a flowchart illustrating a method for performing resource allocation for transmission of VoIP data in a base station according to an embodiment of the present invention.

After transmitting VoIP data in step 601, a base station determines in step 602 whether the number Ntx of transmissions for VoIP data exceeds the number Nper of available persistent resource allocations. Ntx, since it is the number of transmissions, is counted every time the base station transmits data on a persistent resource allocation basis, or receives data. Nper is a predetermined value, and when Ntx is less than or equal to Nper, the base station transmits VoIP data using the persistent scheduling-based persistent resource allocation method.

If it is determined in step 602 that Ntx does not exceed Nper, it indicates that there are persistently allocated resources since there are still remaining persistent resources which were allocated as many times as Nper. In this case, the base station determines in step 606 whether there is a need for resource reallocation information. This is to re-perform resource allocation when there is a need to adjust the position or amount of transmission frequency resources or to adjust an MCS level if needed even after the persistent resource allocation. If it is determined in step 606 that there is a need for resource reallocation, the base station newly performs resource allocation in step 607, and transmits packet data trough PDSCH in step 608. In step 608, the base station can transmit PDCCH since it can change resource allocation information when necessary even though it uses the persistent resource allocation scheme.

However, if it is determined in step 606 that there is no need for resource reallocation, the base station proceeds to step 609 where it transmits PDSCH using information on the persistently allocated resources. If Ntx exceeds Nper in step 602, the base station proceeds to step 603 where it performs resource allocation. To perform resource allocation in step 603, the base station determines whether there are surplus resources, and if there are surplus resources, proceeds to step 604 where it performs dynamic resource allocation. Thereafter, in step 605, the base station transmits VoIP data through PDSCH using the allocated dynamic resources, and transmits even the information on the allocated dynamic resources through the PDCCH. However, if it is determined in step 603 that there is no surplus resource, the base station proceeds to step 610 where it transmits no PDSCH at the corresponding time.

The dynamic resource allocation method performed in step 604 has been described in FIGS. 4, 5A and 5B. First, in allocating dynamic resources in step 604, the base station can allocate the resources so that a time interval between the time the dynamic resources will be allocated and a retransmission time before the time the dynamic resources will be allocated is different from a time interval between the initial transmission and the first retransmission of the data.

Second, in allocating dynamic resources in step 604, the base station can allocate the resources so that a time interval between the time the dynamic resources will be allocated and a retransmission time before the time the dynamic resources will be allocated is equal to the time interval between the initial transmission and the first retransmission of the data.

Third, in step 604, the base station retransmits the data using a first HARQ process used for initial transmission of the data in a predetermined period starting from a generation time of the data, and retransmits the data using a second HARQ process different from the first HARQ process after the predetermined period.

Figure 7:
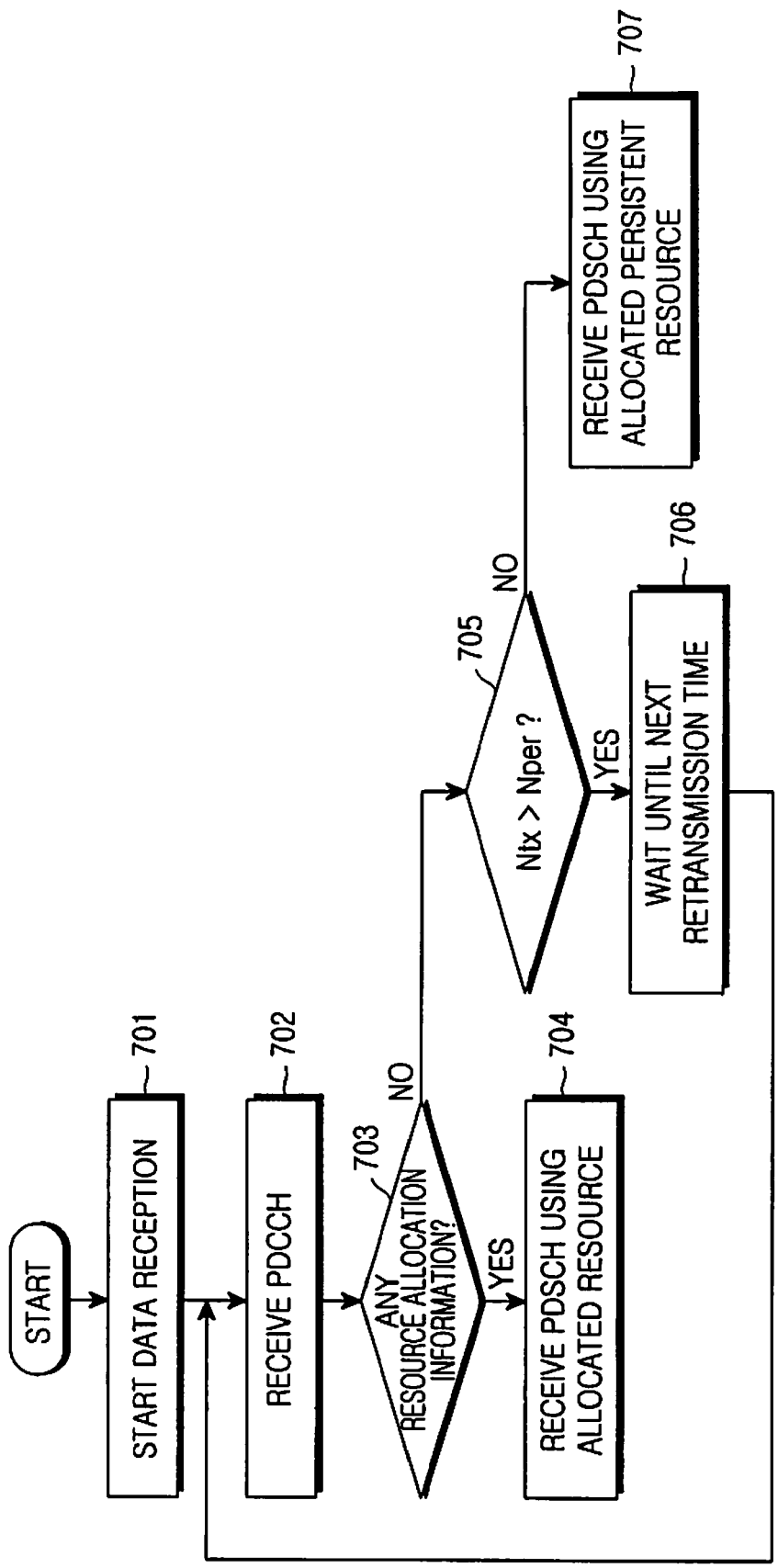
FIG. 7 is a flowchart illustrating a method for receiving VoIP data in a terminal according to an embodiment of the present invention.

FIG. 7 is a flowchart illustrating a method for receiving VoIP data in a terminal according to an embodiment of the present invention. FIG. 7 shows a process the terminal performs in every TTI period.

After performing data reception in step 701, a terminal receives the PDCCH in step 702. The reason why the terminal continuously receives the PDCCH is because even though persistent resource allocation has already been performed, a base station can change the resource allocation information when necessary. Of course, when the base station does not change resource allocation during initial transmission or retransmission to reduce reception complexity of the terminal, it is also possible to determine whether to receive the PDCCH or not taking Nper into consideration. Thereafter, in step 703, the terminal determines whether resource allocation information corresponding thereto exists in PDCCH. In this case, the terminal checks for the existence/non-existence of resource allocation information corresponding by receiving the PDCCH.

If it is determined in step 703 that the resource allocation information exists, the terminal moves to step 704 where it receives the PDSCH using the resource allocation information acquired in step 703. That is, if resources are allocated with the persistent resource allocation scheme, the terminal receives data through the PDSCH using the previously received persistent resource allocation information, and if resources are allocated with the dynamic resource allocation scheme, the terminal will receive the data transmitted through the PDSCH using the resource allocation information received through the PDCCH.

However, if it is determined in step 703 that no resource allocation information corresponding to the terminal itself exists in the PDCCH, the terminal proceeds to step 705 where it determines if Ntx exceeds Nper. If it is determined in step 705 that Ntx does not exceed Nper (Ntx is less than or equal to Nper), the terminal proceeds to step 707 where it receives the PDSCH using the resources allocated with the persistent resource allocation scheme.

However, if it is determined in step 705 that Ntx exceeds Nper, the terminal proceeds to step 706 where it waits until the next retransmission time. That is, in step 706, even though Ntx is greater than Nper, the terminal, since it has not received resource allocation information, waits until the next resource allocation information is transmitted through the PDCCH, perceiving that the retransmission data will be received not by the persistent resource allocation scheme but by the dynamic resource allocation scheme. That is, the terminal waits until resource allocation information is received through the PDCCH in step 702. When the terminal receives PDCCH in step 702 and resource allocation information exists in the PDCCH in step 703, the terminal receives the retransmission data through the resources dynamically allocated according to an embodiment of the present invention.

There are three methods in which when Ntx is greater than Nper, where dynamic resources through which retransmission data will be received are allocated according to an embodiment of the present invention.

First, the resources are allocated so that a time interval between the time the dynamic resources will be allocated and a retransmission time before the time the dynamic resources will be allocated is different from a time interval between the initial transmission and the first retransmission of the data. In the asynchronous HARQ scheme, a scheduler can arbitrarily adjust the time interval.

Second, the resources are allocated so that a time interval between the time the dynamic resources will be allocated and a retransmission time before the time the dynamic resources will be allocated is equal to the time interval between the initial transmission and the first retransmission of the data.

Third, in step 704, the terminal receives the data using a first HARQ process used for initial transmission of the data in a predetermined period starting from a generation time of the data, and receives the data using a second HARQ process different from the first HARQ process after the predetermined period.

It is stated in FIG. 7 that in the downlink from the base station to the terminal, the terminal receives data through dynamically allocated resources allocated by dynamic scheduling when Ntx is greater than Nper, and receives data through persistently allocated resources allocated by persistent scheduling when Ntx is less than or equal to Nper. However, in the uplink from the terminal to the base station, the terminal transmits data on the uplink through dynamically allocated resources allocated by dynamic scheduling when Ntx is greater than Nper, and transmits data on the uplink through persistently allocated resources allocated by persistent scheduling when Ntx is less than or equal to Nper.

Figure 8:
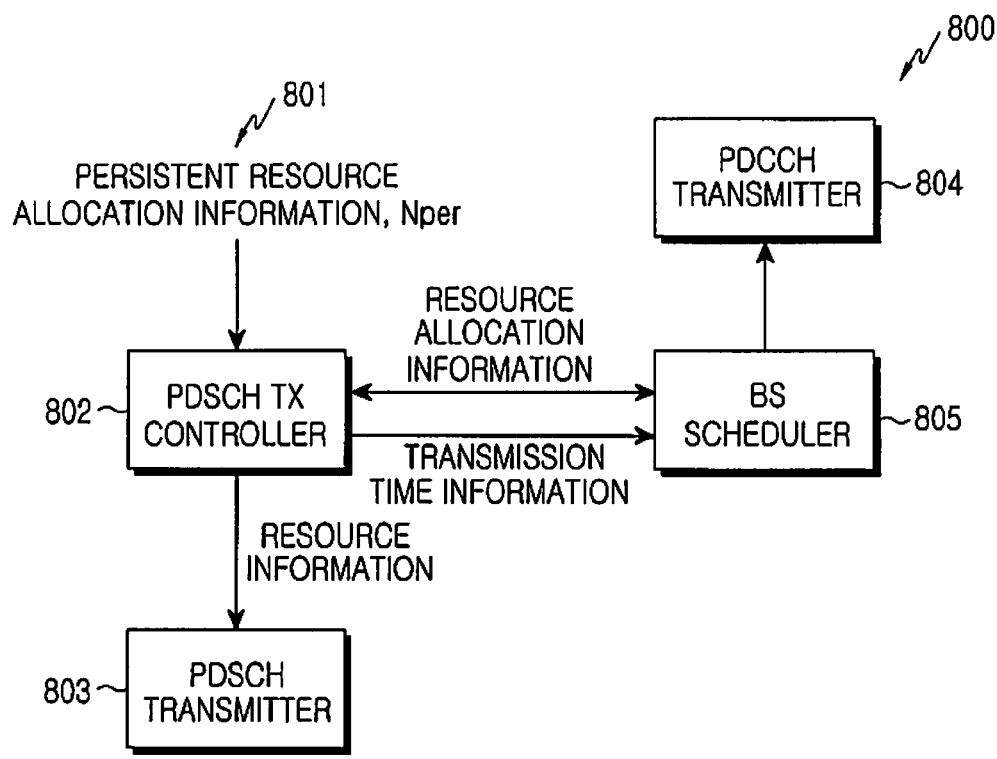
FIG. 8 is a block diagram illustrating a structure of a resource allocation apparatus of a base station according to an embodiment of the present invention.

FIG. 8 is a block diagram illustrating a structure of a resource allocation apparatus 800 of a base station according to an embodiment of the present invention.

A PDSCH transmission controller 802 receives persistent resource allocation information and Nper from an undepicted upper layer as shown by reference numeral 801, receives resource allocation information from a base station scheduler 805, and controls a PDSCH transmitter 803 based thereon to control PDSCH transmission. The resource allocation information delivered from the base station scheduler 805 to the PDSCH transmission controller 802 is dynamic resource allocation information.

That is, the PDSCH transmission controller 802 checks which TTI in the 20-ms period is allocated resources using the persistent resource allocation information, and if corresponding data is data to be transmitted at the TTI allocated resources with the persistent resource allocation information, the PDSCH transmission controller 802 transmits resource information such as frequency information and MCS level, which are set with the persistent resource allocation information, to the PDSCH transmitter 803. Upon receiving the resource information, the PDSCH transmitter 803 transmits data through the PDSCH according to the resource information received from the PDSCH transmission controller 802. On the contrary, upon receiving new resource allocation information from the base station scheduler 805 other than the persistent resource allocation information, the PDSCH transmission controller 802 outputs the new resource information other than the persistent resource allocation information to the PDSCH transmitter 803, and the PDSCH transmitter 803 transmits data through PDSCH using the input resource information.

When allocating resources by means of dynamic scheduling rather than the persistent resource allocation scheme, the base station scheduler 805 controls a PDCCH transmitter 804 so as to transmit resource allocation information corresponding to a TTI period of data to the PDCCH transmitter 804 through the PDCCH. The PDCCH transmitter 804, under the control of the base station scheduler 805, transmits dynamic resource allocation information or scheduling information through the PDCCH.

The PDSCH transmission controller 802 increases Ntx by 1 every time it transmits data. In addition, the PDSCH transmission controller 802 compares the input Nper with the counted Ntx, and determines the PDSCH transmission resources according to the comparison result. That is, when Ntx exceeds Nper, the PDSCH transmission controller 802 receives the new resource allocation information or dynamic resource allocation information from the base station scheduler 805, and controls the PDSCH transmitter 803 so as to transmit data through PDSCH using the input new resource allocation information. At this point, the PDSCH transmission controller 802 provides information on the allocated resources to the PDSCH transmitter 803 to transmit data. If Ntx exceeds Nper, the PDSCH transmission controller 802, since it should transmit data through dynamic scheduling, provides transmission time information indicating the time the data will be transmitted, to the base station scheduler 805. Upon receiving the transmission time information, the base station scheduler 805 controls the PDCCH transmitter 804 so as to transmit dynamic resource information at the time the data is transmitted, as the data is transmitted through dynamic resources when Ntx exceeds Nper. In addition, when the present invention is applied to the uplink, Ntx will be the number of transmissions for the data transmitted by the terminal. When Ntx is greater than Nper, the PDSCH transmission controller 802 allocates dynamic resources to be used for transmitting retransmission data, according to the following three schemes.

First, the PDSCH transmission controller 802 provides possible data transmission time information to the base station scheduler 805 so as to allocate the dynamic resources so that a time interval between the time the dynamic resources will be allocated and a retransmission time before the time the dynamic resources will be allocated is different from a time interval between the initial transmission and the first retransmission of the data.

Second, the PDSCH transmission controller 802 provides possible data transmission time information to the base station scheduler 805 so as to allocate the dynamic resources so that a time interval between the time the dynamic resources will be allocated and a retransmission time before the time the dynamic resources will be allocated is equal to the time interval between the initial transmission and the first retransmission of the data.

Third, the PDSCH transmission controller 802 controls the PDSCH transmitter 803 so as to transmit the data using a first HARQ process used for initial transmission of the data in a predetermined period starting from a generation time of the voice data, and to transmit the data using a second HARQ process different from the first HARQ process after the predetermined period, and provides the data transmission time information to the base station scheduler 805 so as to transmit, through the PDCCH, the dynamic resource allocation scheme to be used for HARQ process where data will be retransmitted.

Figure 9:
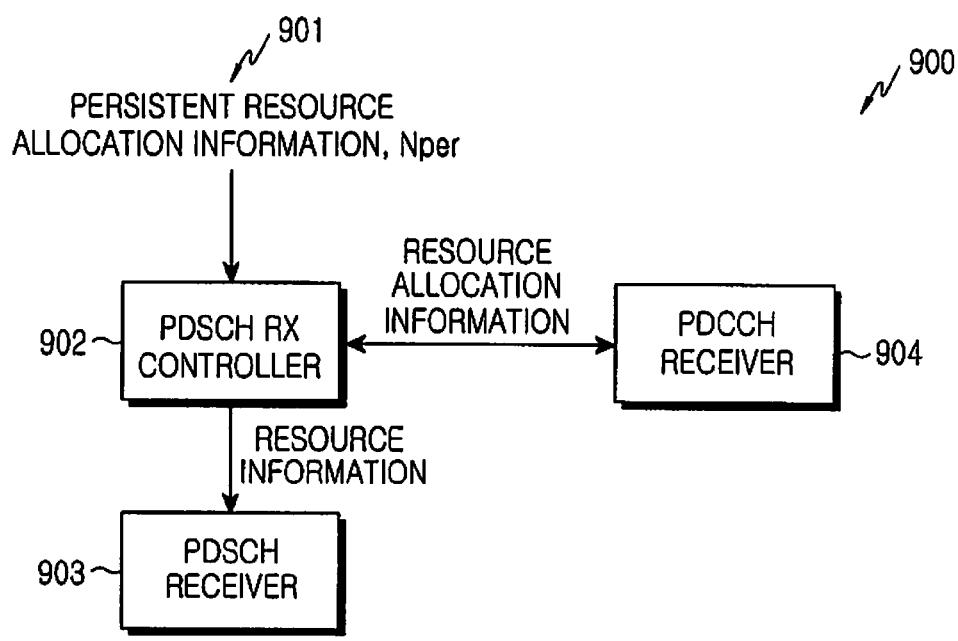
FIG. 9 is a block diagram illustrating a structure of a resource allocation apparatus of a terminal according to an embodiment of the present invention.

FIG. 9 is a block diagram illustrating a structure of a resource allocation apparatus 900 of a terminal according to an embodiment of the present invention.

A PDSCH reception controller 902 receives persistent resource allocation information and Nper from an undepicted upper layer as shown by reference numeral 901, to determine the PDSCH reception, and provides even the resource information for receiving data to be transmitted through the PDSCH, to a PDSCH receiver 903. The PDSCH receiver 903 receives data transmitted through the PDSCH using the resource information provided by the PDSCH reception controller 902. In addition, when Ntx is greater than Nper, the PDSCH reception controller 902 controls the PDSCH receiver 903 so as to wait until the next retransmission time, and when Ntx is less than or equal to Nper, the PDSCH reception controller 902 controls the PDSCH receiver 903 so as to receive data through the PDSCH using the previously received persistent resource allocation information since there are still persistently allocated resources. A PDCCH receiver 904 receives the PDCCH from a base station, and upon receipt of resource allocation information through the PDCCH, provides it to the PDSCH reception controller 902 so as to receive the data transmitted through PDSCH at the time the resource allocation information was received through the PDCCH.

If the PDSCH reception controller 902, even though Ntx is greater than Nper, has failed to receive resource allocation information for receiving retransmission data, it can perceive that the retransmission data will be received with the dynamic resource allocation scheme instead of the persistent resource allocation scheme. Therefore, the PDSCH reception controller 902 controls the PDSCH receiver 903 so as to receive the retransmission data through the PDSCH using the resources allocated by dynamic scheduling. When the PDCCH receiver 904 receives scheduling information through the PDCCH, the PDSCH reception controller 902 controls the PDSCH receiver 903 so as to receive data using the resource information corresponding to the scheduling information at the transmission time of the data to be transmitted by the scheduling information. In the uplink, Ntx can be the number of transmissions for the data transmitted by the terminal. There are three methods in which when Ntx is greater than Nper, the PDSCH reception controller 902 allocates dynamic resources through which it will receive retransmission data according to an embodiment of the present invention.

First, in the asynchronous scheme, the terminal receives data using the dynamic resources allocated such that a time interval between the time the dynamic resources will be allocated and a retransmission time before the time the dynamic resources will be allocated is different from a time interval between the initial transmission and the first retransmission of the data. In the asynchronous HARQ scheme, a scheduler can arbitrarily adjust the time interval.

Second, in the synchronous scheme, the terminal receives data using the dynamic resources allocated such that a time interval between the time the dynamic resources will be allocated and a retransmission time before the time the dynamic resources will be allocated is equal to the time interval between the initial transmission and the first retransmission of the data.

Third, the terminal receives the data using a first HARQ process used for initial transmission of the data in a predetermined period starting from a generation time of the data, and receives the data using a second HARQ process different from the first HARQ process after the predetermined period. On the contrary, as described above, if the present invention is applied to the uplink, the terminal will transmit data to the base station through the resources allocated by dynamic scheduling when Ntx is greater than Nper, and will transmit data to the base station through the resources allocated by persistent scheduling when Ntx is less than or equal to Nper.

As is apparent from the foregoing description, when there is a need for frequent retransmission of VoIP data in the mobile communication system, the present invention can reduce the overhead of control signaling necessary for resource allocation, and increase the efficiency of wireless resources of the network.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A resource allocation method for uplink transmission of a terminal in a mobile communication system, the method comprising:
   receiving resource allocation information from a base station for the uplink transmission, wherein the resource allocation information from the base station for the uplink transmission is related to the resources allocated by a persistent resource allocation scheme or a dynamic resource allocation scheme according to a comparison result between a number Ntx of data transmissions at the terminal and a number Nper of available persistent resource allocations, and
   wherein the number Nper denotes a number of transmissions where persistent resource allocation is available.

2. The resource allocation method of claim 1, wherein the resource allocation information from the base station for the uplink transmission are resources allocated by the persistent resource allocation scheme when the number Ntx is less than or equal to the number Nper, and are resources allocated by the dynamic resource allocation scheme when the number Ntx is greater than the number Nper.

3. A resource allocation method for downlink transmission of a base station in a mobile communication system, the method comprising:
   comparing a number Ntx of data transmissions with a number Nper of available persistent resource allocations; and
   allocating resources by a persistent resource allocation scheme or a dynamic resource allocation scheme according to the comparison result,
   wherein the number Nper denotes a number of transmissions where persistent resource allocation is available.

4. The resource allocation method of claim 3, wherein allocating resources comprises:
   allocating resources by the persistent resource allocation scheme when the number Ntx is less than or equal to the number Nper; and
   allocating resources by the dynamic resource allocation scheme when the number Ntx is greater than the number Nper.

5. A terminal apparatus for a mobile communication system, the apparatus comprising:
   a reception unit for receiving resource allocation information from a base station for uplink transmission;
   wherein the resource allocation information from the base station for the uplink transmission is related to the resources allocated by a persistent resource allocation scheme or a dynamic resource allocation scheme according to a comparison result between a number Ntx of data transmissions at the terminal apparatus and a number Nper of available persistent resource allocations, and
   wherein the number Nper denotes a number of transmissions where persistent resource allocation is available.

6. The terminal apparatus of claim 5, wherein the uplink resources allocated from the base station for the uplink transmission are resources allocated by the persistent resource allocation scheme when the number Ntx is less than or equal to the number Nper, and are resources allocated by the dynamic resource allocation scheme when the number Ntx is greater than the number Nper.

7. A base station apparatus for a mobile communication system, the apparatus comprising:

a resource allocation controller for comparing a number Ntx of data transmissions with a number Nper of available persistent resource allocations, and allocating resources by a persistent resource allocation scheme or a dynamic resource allocation scheme according to the comparison result; and a transmitter for transmitting information comprising the allocated resources, wherein the number Nper denotes a number of transmissions where persistent resource allocation is available.

8. The base station apparatus of claim 7, wherein the uplink resources allocated from the base station apparatus are resources allocated by the persistent resource allocation scheme when the number Ntx is less than or equal to the number Nper, and resources allocated by the dynamic resource allocation scheme when the number Ntx is greater than the number Nper.

9. The resource allocation method of claim 1, wherein the number Nper of available persistent resource allocations is set using channel condition, moving velocity and available transmission power of each terminal.

10. The resource allocation method of claim 1, wherein the number Nper of available persistent resource allocations is set using a desired average number of transmissions for each cell.

11. The resource allocation method of claim 3, wherein the number Nper of available persistent resource allocations is set using channel condition, moving velocity and available transmission power of each terminal.

12. The resource allocation method of claim 3, wherein the number Nper of available persistent resource allocations is set using a desired average number of transmissions for each cell.

13. The terminal apparatus of claim 5, wherein the number Nper of available persistent resource allocations is set using channel condition, moving velocity and available transmission power of each terminal.

14. The terminal apparatus of claim 5, wherein the number Nper of available persistent resource allocations is set using a desired average number of transmissions for each cell.

15. The base station apparatus of claim 7,
wherein the number Nper of available persistent resource allocations is set using channel condition, moving velocity and available transmission power of each terminal.

16. The base station apparatus of claim 7,
wherein the number Nper of available persistent resource allocations is set using a desired average number of transmissions for each cell.

\* \* \* \* \*